(12) United States Patent
Maeda et al.

(10) Patent No.: US 11,715,407 B2
(45) Date of Patent: Aug. 1, 2023

(54) IMAGE DISPLAY APPARATUS

(71) Applicant: SINTOKOGIO, LTD., Nagoya (JP)

(72) Inventors: Koki Maeda, Nagoya (JP); Takashi Suzuki, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 0 days.

(21) Appl. No.: 17/533,456

(22) Filed: Nov. 23, 2021

(65) Prior Publication Data
US 2022/0172666 A1 Jun. 2, 2022

(30) Foreign Application Priority Data

Nov. 30, 2020 (JP) .................. 2020-198527

(51) Int. Cl.
*G09G 3/20* (2006.01)
(52) U.S. Cl.
CPC ......... *G09G 3/2092* (2013.01); *G09G 3/2003* (2013.01); *G09G 2320/0626* (2013.01); *G09G 2320/0666* (2013.01); *G09G 2340/12* (2013.01); *G09G 2354/00* (2013.01)
(58) Field of Classification Search
CPC ............... G09G 3/2092; G09G 3/2003; G09G 2320/0626; G09G 2320/0666; G09G 2340/12; G09G 2354/00
See application file for complete search history.

(56) References Cited

U.S. PATENT DOCUMENTS

| 4,886,370 A | 12/1989 | Koshihara et al. |
| 8,242,445 B1 | 8/2012 | Scanlon et al. |
| 2019/0187019 A1 | 6/2019 | Ekeroth |
| 2019/0371014 A1 | 12/2019 | Etoh |
| 2020/0166409 A1 | 5/2020 | Nemoto et al. |
| 2021/0033471 A1 | 2/2021 | Nakamura et al. |

FOREIGN PATENT DOCUMENTS

JP 2013-83666 A 5/2013

OTHER PUBLICATIONS

U.S. Office Action for U.S. Appl. No. 17/227,471 dated Jul. 11, 2022.
U.S. Office Action for corresponding U.S. Appl. No. 17/227,471 dated Nov. 28, 2022.
U.S. Office Action for corresponding U.S. Appl. No. 17/227,471 dated May 25, 2023.

*Primary Examiner* — Antonio A Caschera
(74) *Attorney, Agent, or Firm* — Harness, Dickey & Pierce, P.L.C.

(57) ABSTRACT

A control section according to an embodiment of the present invention is configured to: set, as a first temperature, a temperature obtained from a thermal image at a first position contained in a first infrared image corresponding to a surrounding environment in the thermal image, and set, as a second temperature, a temperature obtained from the thermal image at a second position contained in a second infrared image corresponding to a duct or the like in the thermal image; calculate an upper limit and a lower limit of a temperature range by using the first temperature and the second temperature; and control a display section to display the thermal image such that temperature distribution on the subject is represented by colors within the temperature range having the upper limit and the lower limit that have been calculated.

7 Claims, 12 Drawing Sheets

FIG. 10

$Tw = k \times A \times (T_2 - T_1)^B + C$

| Integer value | Scaling factor k |
|---|---|
| 1 | 1/5 |
| 2 | 1/4 |
| 3 | 1/3 |
| 4 | 1/2 |
| 5 | 1 |
| 6 | 2 |
| 7 | 3 |
| 8 | 4 |
| 9 | 5 |

IMAGE DISPLAY APPARATUS

This Nonprovisional application claims priority under 35 U.S.C. § 119 on Patent Application No. 2020-198527 filed in Japan on Nov. 30, 2020, the entire contents of which are hereby incorporated by reference.

TECHNICAL FIELD

The present invention relates to an image display apparatus.

BACKGROUND ART

Patent Literature 1 discloses a method of diagnosing a clogging condition of a slurry pipe on the basis of thermal images which are obtained by (i) capturing, with use of an infrared camera, images that represent transient changes in temperature of the external surface of the slurry duct in an area to be diagnosed (hereinafter, referred to as "diagnosis area") and (ii) processing the images with use of an image processing device.

CITATION LIST

Patent Literature

[Patent Literature 1]
Japanese Patent Application Publication, Tokukai, No. 2013-83666

SUMMARY OF INVENTION

Technical Problem

However, according to a conventional method disclosed in Patent Literature 1, if in the vicinity of the diagnosis area, there is an object which greatly differs in temperature from the diagnosis area, the temperature range of a thermal image which contains the diagnosis area and the object in the vicinity of the diagnosis area is set wide to include the temperature of the object.

In this case, in order to display, in the thermal image, a slight difference in temperature in the diagnosis area, a user has to adjust the temperature range himself/herself. The user in this case has to determine the temperature range which allows for display of even a slight difference in temperature. This is work that is very troublesome to the user.

The present invention is attained in view of the above problems. An object of an aspect of the present invention is to provide an image display apparatus which allows a user to save a trouble of adjusting a temperature range in causing a thermal image to be displayed.

Solution to Problem

In order to solve the above problem, an image display apparatus in accordance with an embodiment of the present invention includes: a display section having a screen for displaying a thermal image in which temperature distribution on a subject is represented by colors, the subject including a pipe or the like for a fluid to flow therein and a surrounding environment where the pipe or the like is provided; and a control section configured to control the display section, the control section being configured to: set, as a first temperature, a temperature obtained from the thermal image at a first position contained in a first image corresponding to the surrounding environment in the thermal image, and set, as a second temperature, a temperature obtained from the thermal image at a second position contained in a second image corresponding to the duct or the like in the thermal image; calculate an upper limit and a lower limit of a temperature range by using the first temperature and the second temperature; and control the display section to display the thermal image such that the temperature distribution on the subject is represented by colors within the temperature range having the upper limit and the lower limit that have been calculated.

Advantageous Effects of Invention

An aspect of the present invention allows a user to save a trouble of adjusting a temperature range in causing a thermal image to be displayed.

BRIEF DESCRIPTION OF DRAWINGS

FIG. 10 illustrates an example of a setting screen for changing a scaling factor in a calculation formula.

DESCRIPTION OF EMBODIMENTS

Embodiment 1

Figure 1:
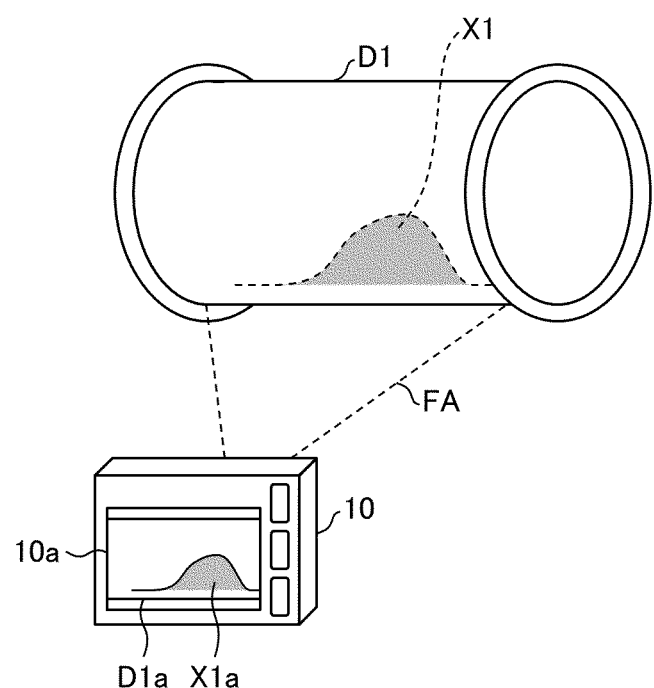
FIG. 1 illustrates the appearance of an image display apparatus in accordance with Embodiment 1, and is a front view of the image display apparatus.
Figure 2:
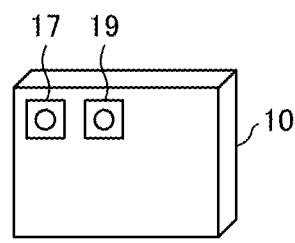
FIG. 2 illustrates the appearance of the image display apparatus in accordance with Embodiment 1, and is a back view of the image display apparatus.

FIGS. 1 and 2 illustrate the appearance of an image display apparatus 10 in accordance with Embodiment 1 of the present invention. FIG. 1 is a front view of the image display apparatus 10. FIG. 2 is a back view of the image display apparatus 10. As illustrated in FIGS. 1 and 2, the image display apparatus 10 is a wireless terminal that can be carried around by a user. The image display apparatus 10 is, for example, a mobile phone, a smartphone, a tablet computer, or a laptop personal computer. As illustrated in FIG. 1, the image display apparatus 10 has a screen 10a on its front side. As illustrated in FIG. 2, the image display apparatus 10 has a visible-light camera 17 and an infrared camera 19 on its back side. However, the visible-light camera 17 is not essential in the image display apparatus 10.

The image display apparatus 10 is not limited to a wireless terminal that can be carried around by a user. The image display apparatus 10 can be a stationary apparatus. The stationary apparatus is, for example, a desktop personal computer. Further, in cases where the image display apparatus 10 is a stationary apparatus, the image display apparatus 10 can have a configuration in which the visible-light camera 17 and the infrared camera 19 are detachable from a main body of the image display apparatus 10. In such a case, the visible-light camera 17 and the infrared camera 19 are portable. The visible-light camera 17 and the infrared camera 19 are each connected to the main body of the image display apparatus 10 wirelessly or via wire.

Note that the following description will discuss, as an example, an embodiment in which the image display apparatus 10 is a wireless terminal that can be carried around by a user.

The visible-light camera 17 is a camera that is sensitive to wavelength(s) in the visible wavelength range and that captures a visible light image by detecting visible light from a subject. The infrared camera 19 is a camera that is sensitive to wavelength(s) in the infrared wavelength range and that captures an infrared image by detecting infrared light from a subject. The field-of-view of the visible-light camera 17 and the field-of-view of the infrared camera 19 substantially coincide with each other. In FIG. 1, the field-of-view of the visible-light camera 17 and the field-of-view of the infrared camera 19 are both "field-of-view FA". The image display apparatus 10 is a wireless terminal that can be carried around by a user; therefore, the user can move to a desired place and direct the field-of-view FA of the visible-light camera 17 and the infrared camera 19 in a desired direction.

FIG. 1 shows a manner in which the image display apparatus 10 captures an image of a duct D1. The duct D1 is, for example, a pipe or the like for a fluid to flow and travel therein. The term "fluid" is a generic term for liquid and gas. The pipe or the like can be, for example, a duct, a damper, or a device that uses fluid energy. The duct D1 is, for example, installed in a building such as a steel plant for the purpose of air conditioning, ventilation, smoke exhaustion, or the like. The duct D1 is an example of the "pipe or the like". A part of the appearance of the duct D1 which part is included in the foregoing field-of-view FA is an example of the subject whose image is to be captured by the image display apparatus 10. Note that the field-of-view FA may include an environment surrounding the duct D1 (hereinafter "surrounding environment"), in addition to the duct D1. The surrounding environment is, for example, an environment in which a support member supports the duct D1 and/or an environment in which an apparatus and a wall are disposed in the vicinity of the duct D1 when viewed from the image display apparatus 10. In this case, the subject also includes such a surrounding environment.

In FIG. 1, the duct D1 has therein a deposit X1, which is made of dust settled and accumulated on the inner wall of the duct D1. Heat transfer from the fluid flowing within the duct D1 to the deposit X1 and that from the fluid to the inner wall of the duct D1 are different from each other, and therefore the manner in which heat is drawn to the deposit X1 and the manner in which heat is drawn to the inner wall of the duct D1 are different from each other. This results in a difference in temperature, at the surface of the duct D1, between (i) a part of the surface which part opposes an inner wall where the deposit X1 is present, and an area surrounding that part, and (ii) the remainder of the surface, i.e., an area except for that part of the surface and the surrounding area. The image display apparatus 10 observes this difference in temperature with use of the infrared camera 19, thereby detecting a boundary between the above areas (i) and (ii). The user identifies the presence of the deposit X1 on the basis of the presence of the detected boundary.

In FIG. 1, the image display apparatus 10 causes the screen 10a to display a visible light image captured by the visible-light camera 17 and a thermal image based on an infrared image captured by the infrared camera 19 such that the visible light image and the thermal image are superimposed on top of each other. The screen 10a displays a duct image D1a which is an image corresponding to the duct D1 and a deposit image X1a which is an image corresponding to the deposit X1. The duct image D1a is contained in the visible light image. The deposit image X1a is contained in the thermal image. The user can see the deposit image X1a contained in the thermal image and the duct image D1a contained in the visible light image together. This allows the user to easily recognize the position of the deposit image X1a.

Figure 3:
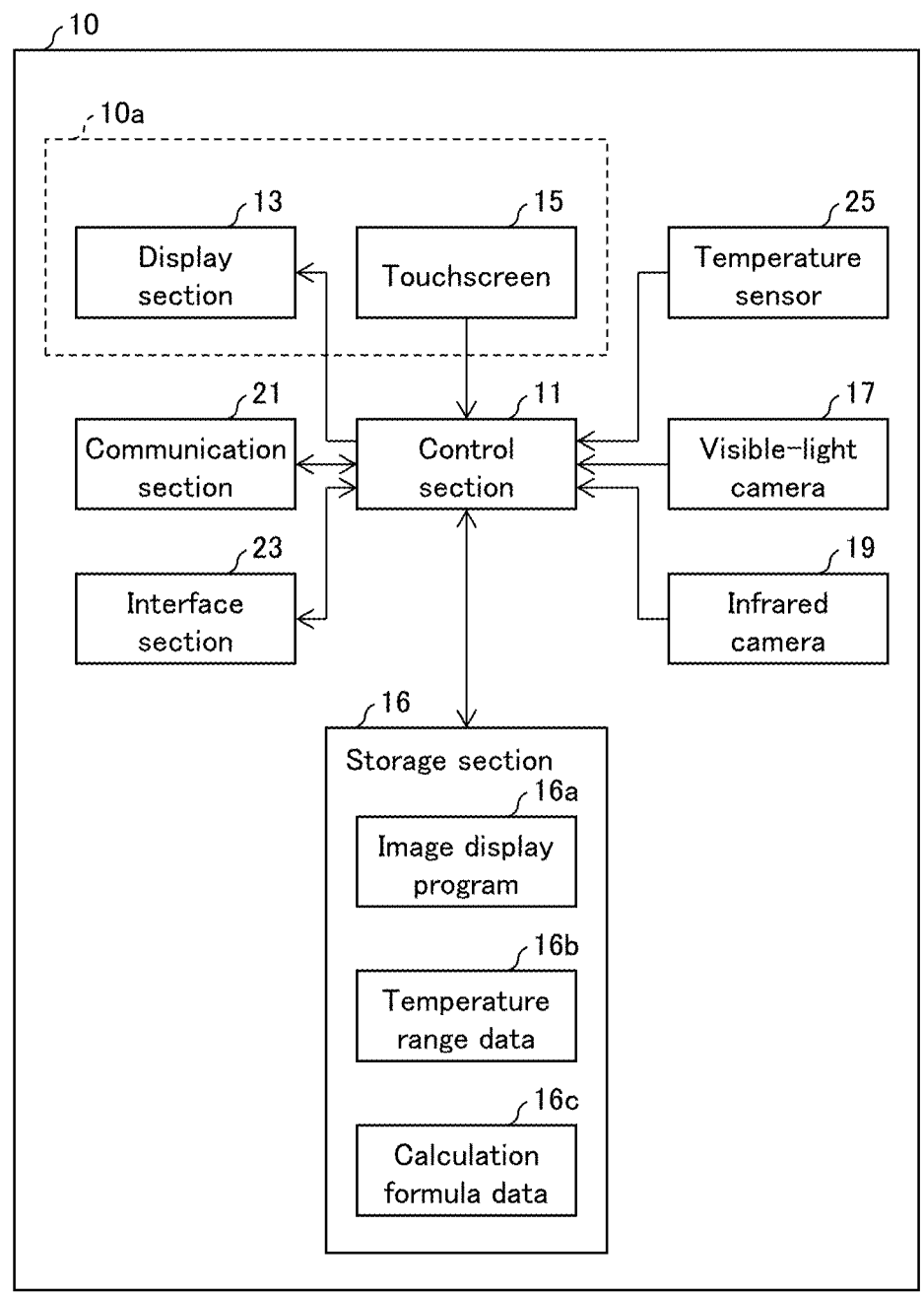
FIG. 3 is a block diagram illustrating an internal configuration of the image display apparatus in accordance with Embodiment 1.

FIG. 3 is a block diagram illustrating an internal configuration of the image display apparatus 10. The image display apparatus 10 includes: a control section 11 that carries out overall control of operation of the image display apparatus 10; a display section 13 that displays various types of information; a touchscreen 15 via which a user can perform operations; a storage section 16 that stores data and programs; a communication section 21 for connection with a network; and an interface section 23 for connection with an external apparatus. The image display apparatus 10 further includes the visible-light camera 17 and the infrared camera 19, as described earlier. The image display apparatus 10 may include a temperature sensor 25.

The display section 13 is composed of, for example, a liquid crystal display or an organic light emitting display. The touchscreen 15 is, for example, an input device that detects a touch operation which is performed with user's finger or a stylus pen. The touchscreen 15 is disposed such that its area for operation is superimposed on a display area of the display section 13. The screen 10a in FIG. 1 includes the display section 13 and the touchscreen 15.

The communication section 21 is a device for connection with a network (not illustrated). The communication section 21 communicates with the network in accordance with a communication standard such as 3G, 4G, LTE or 5G. The interface section 23 is a device for connection with an external apparatus (not illustrated).

The storage section 16 is a storage medium that stores parameters, data, control programs, and/or the like for use in implementing a predetermined function. The storage section 16 is composed of, for example, a hard disk, a semiconductor storage device, or a semiconductor memory.

The storage section 16 stores an image display program 16a, temperature range data 16b, and a calculation formula data 16c which are for implementing a function of the image display apparatus 10 (such a function will be described later). The image display program 16a is an example of a control program. The temperature range data 16b and the calculation formula data 16c will be described later in detail.

The control section 11 includes a central processing unit (CPU). The control section 11 implements the function of the image display apparatus 10 (the function will be described later) by the CPU executing the image display program 16a. Note that the control section 11 may be realized only by a hardware circuit designed especially for implementation of a specific function.

Figure 4:
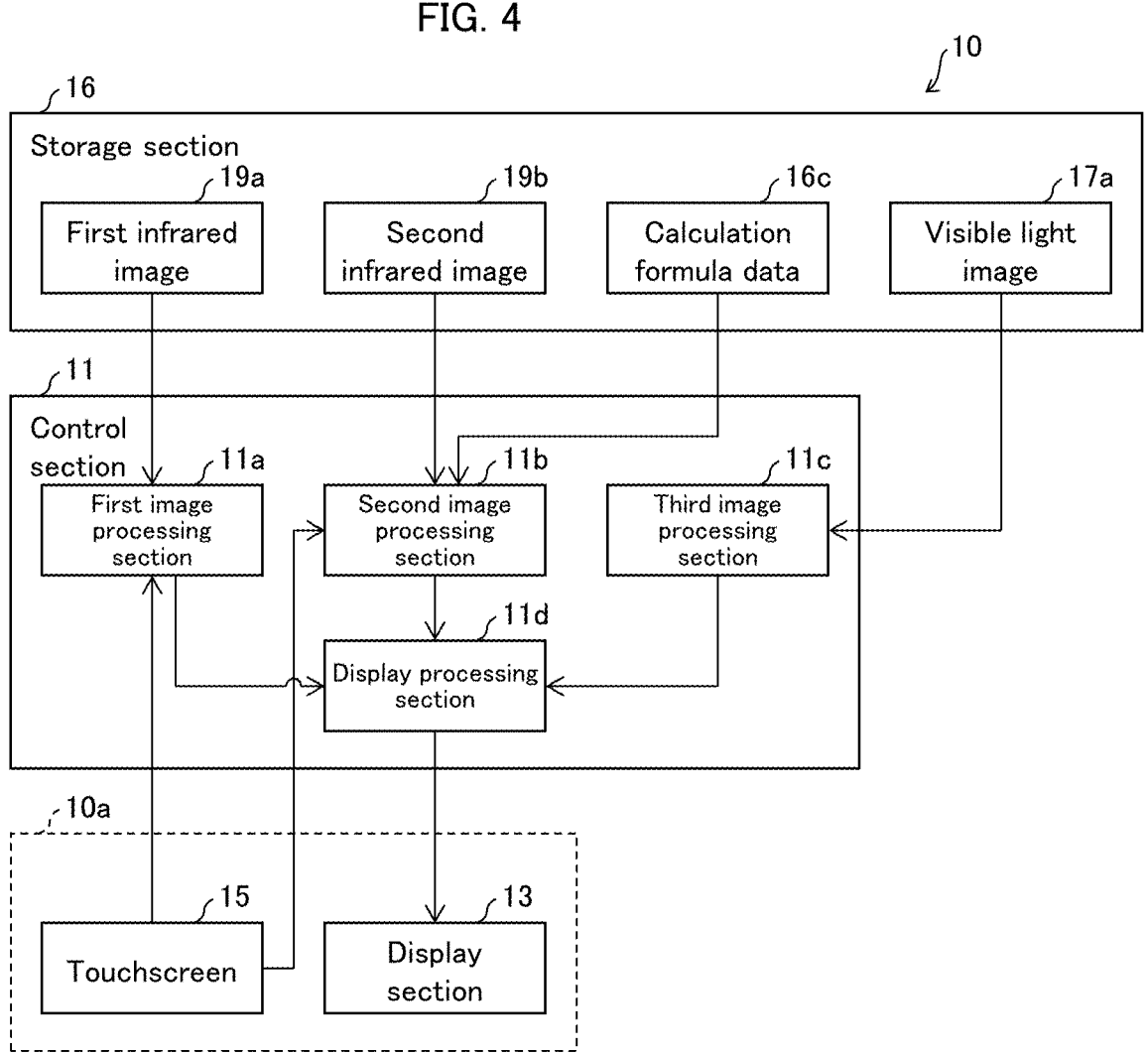
FIG. 4 illustrates a functional configuration of a control section included in the image display apparatus in accordance with Embodiment 1.

FIG. 4 illustrates a functional configuration of the control section 11. The control section 11 includes a first image processing section 11a, a second image processing section 11b, a third image processing section 11c, and a display processing section 11d. The processing sections 11a, 11b, 11c, and 11d included in the control section 11 are realized by the control section 11 executing the image display program 16a.

The following description will discuss operation of the control section 11 in FIG. 4.

The image display apparatus 10 has the function of causing the display section 13 to display (i) a thermal image based on an infrared image captured by the infrared camera 19 and (ii) a visible light image captured by the visible-light camera 17 such that the visible light image is superimposed on the thermal image. The "thermal image" herein means an image which is generated from an infrared image and in which each pixel is colored according to temperature information indicative of the temperature of a part of a subject included in that pixel. The color of each pixel is set within a temperature range having upper and lower limits set. This makes it possible to generate a thermal image in which temperature distribution on the subject is represented by colors within the foregoing temperature range. This function of displaying an image is realized by the image display program 16a.

Note that the color of each pixel may be set such that at least one of the three components of color (i.e., "hue", "saturation", and "lightness") varies depending on the temperature of that pixel. For example, the "saturation" and "lightness" may be varied with the "hue" fixed. Alternatively, the "hue" may be varied with the "saturation" and "lightness" fixed. The following description will discuss an example embodiment in which the "hue" is varied with the "saturation" and "lightness" fixed.

Figure 5:
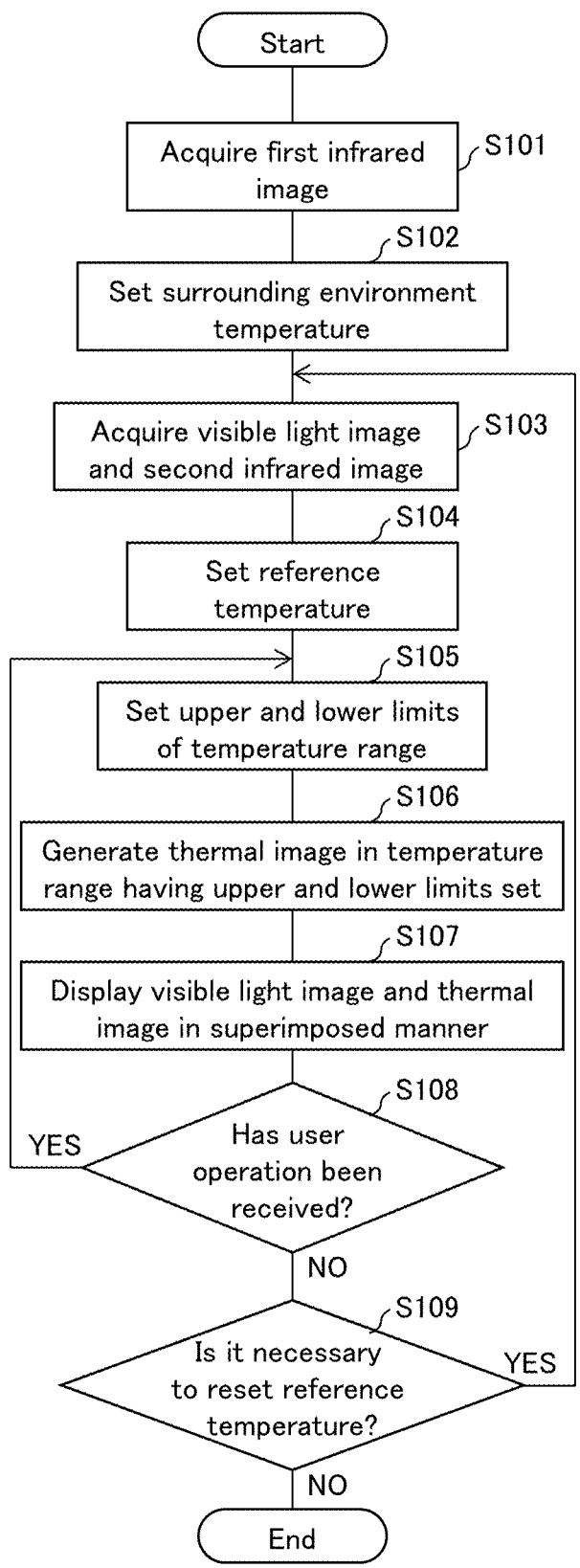
FIG. 5 is a flowchart illustrating operation of the image display apparatus in accordance with Embodiment 1.

The following description will discuss operation of the image display apparatus 10, with reference to FIG. 5. FIGS. 3 and 4 are also referenced as necessary. FIG. 5 is a flowchart illustrating the operation of the control section 11 illustrated in FIG. 4.

Figure 6:
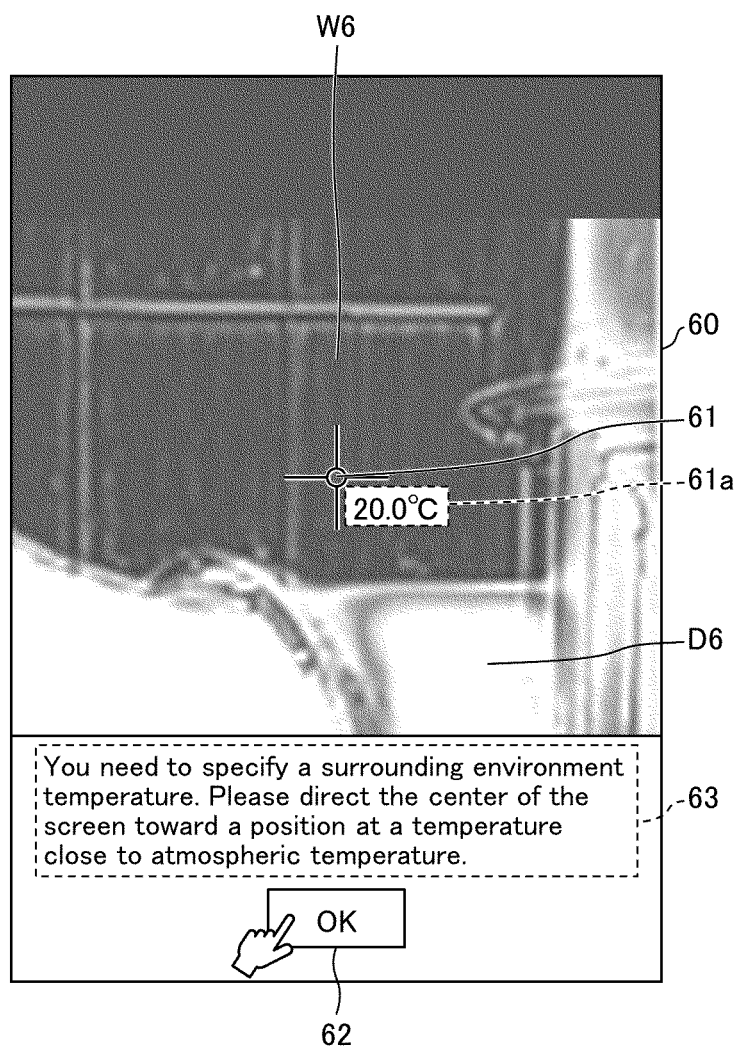
FIG. 6 illustrates an example of a setting screen for a surrounding environment temperature in determining the surrounding environment temperature.
Figure 7:
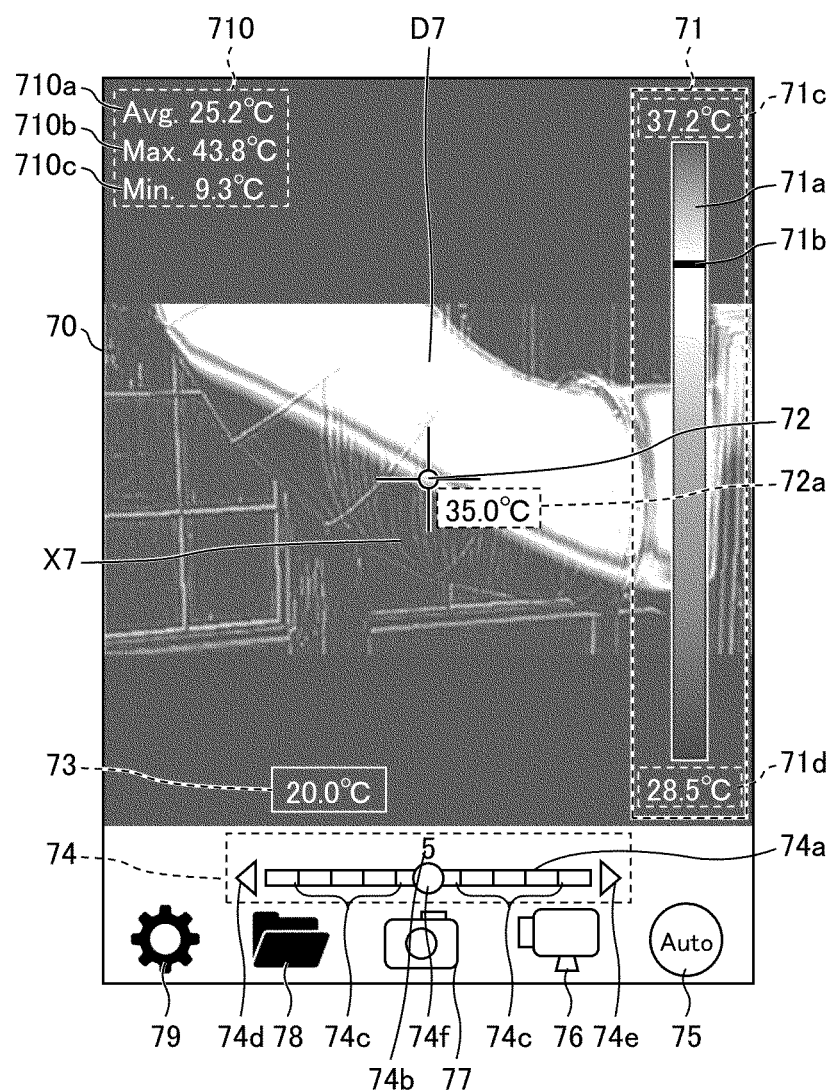
FIG. 7 illustrates an example of an output screen for displaying a reference temperature and a temperature range.

Further, the following also makes reference to FIGS. 6 and 7 each illustrating an example of the screen 10a. The following will describe FIGS. 6 and 7 prior to describing the operation of the image display apparatus 10.

FIG. 6 shows an example of the screen 10a in which a visible light image and a thermal image are displayed by the image display apparatus 10. As shown in FIG. 6, a screen example 60 (an example of the screen 10a) displays (i) a visible light image including a duct D6 and a wall W6 which is a surrounding environment of the duct D6 and (ii) a thermal image generated from an infrared image of the duct D6 and the wall W6 such that the visible light image and the thermal image are superimposed on top of each other. The thermal image is an image which is generated from the infrared image by changing the hue of each pixel included in the infrared image in accordance with temperature information on that pixel. Hues are allocated to respective temperatures, in a temperature range between the minimum and maximum values of temperatures in the infrared image. Note that the duct D6 is an example of the "pipe or the like". Also note that the duct D6 and the wall W6 are an example of the "subject".

The screen example 60 in FIG. 6 also displays a reference position mark 61 such that the reference position mark 61 is superimposed on the visible light image and the thermal image. The reference position mark 61 is located at, for example, the center (first position) of the screen 10a. For example, in order to have the reference position mark 61 located on the wall W6, a user need only direct the center of the field-of-view FA of the image display apparatus 10 toward the wall W6. Note that the reference position mark 61 does not necessarily need to be located at the center of the screen 10a. The reference position mark 61 may be located, for example, at or near the upper right corner of the screen 10a or at or near the lower left corner of the screen 10a. The position of the reference position mark 61 may be pre-set or may be set as appropriate by a user. In a case where the position of the reference position mark 61 is set by a user, the user may set the position of the reference position mark 61 by, for example, a touch operation which is performed with user's finger or a stylus pen. The following description will discuss an example embodiment in which the reference position mark 61 is located at the center of the screen 10a.

The screen example 60 in FIG. 6 also displays a temperature display area 61a indicating "20.0° C.", in the vicinity of the reference position mark 61. Further, the screen example 60 in FIG. 6 displays an OK button 62 which prompts a user to perform a touch operation, and a comment area 63 in which the following comments are provided as a message to the user: "You need to specify a surrounding environment temperature. Please direct the center of the screen toward a position at a temperature close to atmospheric temperature". The temperature display area 61a, the OK button 62, and the comment area 63 will be described later when the operation of the image display apparatus 10 is described.

FIG. 7 shows another example of the screen 10a in which a visible light image and a thermal image are displayed by the image display apparatus 10. As shown in FIG. 7, a screen example 70 (an example of the screen 10a) displays (i) a visible light image of a duct D7 and its surrounding environment and (ii) a thermal image generated from an infrared image of the duct D7 and its surrounding environment such that the visible light image and the thermal image are superimposed on top of each other. The thermal image is an image which is generated from the infrared image by changing the hue of each pixel included in the infrared image in accordance with temperature information on that pixel. Note that the duct D7 is an example of the "pipe or the like". Also note that the duct D7 and its surrounding environment are an example of the "subject". Further, the duct D7 is connected to the duct D6 in FIG. 6.

The screen example 70 in FIG. 7 displays, in an area 71, a color bar 71a (first rectangular image) such that the color bar 71a is superimposed on the thermal image. The screen example 70 in FIG. 7 also displays, in an area 74, a scaling factor adjusting bar 74a (second rectangular image). Particularly, the scaling factor adjusting bar 74a is a user interface via which the user performs a touch operation for setting a scaling factor k (third variable), which will be described later. This allows the user to intuitively perform operations.

The screen example 70 in FIG. 7 also displays a reference position mark 72 such that the reference position mark 72 is superimposed on the thermal image. The reference position mark 72 is located at, for example, the center (second position) of the screen 10a. The reference position mark 72 has the same configuration and function as those of the reference position mark 61 in FIG. 6, and therefore, a description thereof is omitted here.

The screen example 70 in FIG. 7 displays a temperature display area 72a indicating "35.0° C.", in the vicinity of the reference position mark 72. The screen example 70 also displays a temperature display area 73 indicating "20.0° C.". The temperature display area 73 indicates "20.0° C." which is indicated in the temperature display area 61a in FIG. 6. Further, the screen example 70 displays a temperature display area 710. The temperature display area 710 indicates: "Avg. 25.2° C." denoted by a reference sign 710a; "Max. 43.8° C." denoted by a reference sign 710b; and "Min. 9.3° C." denoted by a reference sign 710c. The screen example 70 in FIG. 7 also displays, below the area 74, a mode change button 75, a moving image capture button 76, a screen shot button 77, a folder reference button 78, and a setting button 79, which prompt a user to perform a touch operation. The above-described components displayed on the screen example 70 will be described later, when the operation of the image display apparatus 10 is described. Note that the above-described components include, for example, the color bar 71a, the scaling factor adjusting bar 74a, the above-described temperature display areas, and the above-described buttons.

The above has described FIGS. 6 and 7. Next, the following will describe the operation of the image display apparatus 10.

Step S101: The control section 11 acquires a first infrared image 19a of the duct D6 and the wall W6, the first infrared image 19a having been captured by the infrared camera 19. The control section 11 causes the storage section 16 to store the infrared image 19a acquired from the infrared camera 19.

More specifically, in the step S101, the control section 11 causes the display section 13 to display the screen example 60 in FIG. 6. Then, a user directs the center of the field-of-view FA of the image display apparatus 10 toward the wall W6, following comments in the comment area 63: "You need to specify a surrounding environment temperature. Please direct the center of the screen toward a position at a temperature close to atmospheric temperature". The temperature of the wall W6 is close to an outside air temperature. Hereinafter, this temperature is referred to as a surrounding environment temperature (first temperature). When the reference position mark 61 is directed toward the wall W6, the user performs a touch operation on the OK button 62. In response to this touch operation, the control section 11 causes the storage section 16 to store the first infrared image 19a. The first infrared image (first image) 19a stored in the storage section 16 is an infrared image in which the reference position mark 61 is directed toward the wall W6, as shown in FIG. 6.

Step S102: The first image processing section 11a of the control section 11 reads out the first infrared image 19a stored in the storage section 16, and acquires temperature information on each pixel included in the first infrared image 19a thus read out. The first image processing section 11a sets the surrounding environment temperature, with use of the temperatures of pixels which are included in the first infrared image 19a and which correspond to the reference position mark 61 and its surrounding area. In a case where the temperatures of the pixels are different, the average of the temperatures of the pixels may be used as the surrounding environment temperature. In the screen example 60 of FIG. 6, the surrounding environment temperature is "20.0° C." as shown in the temperature display area 61a. The surrounding environment temperature is stored in the storage section 16. The surrounding environment temperature may be obtained from the temperature sensor 25.

Note that respective images of components excluding the thermal image and the visible light image in the screen example 60 of FIG. 6 are generated by the first image processing section 11a, and outputted to the display processing section 11d. The display processing section 11d causes the screen 10a to display the images inputted from the first image processing section 11a.

Step S103: The control section 11 further acquires a visible light image 17a of the duct D7 and its surrounding environment, the visible light image 17a having been captured by the visible-light camera 17. The control section 11 further acquires a second infrared image 19b of the duct D7 and its surrounding environment, the second infrared image 19b having been captured by the infrared camera 19. The control section 11 causes the storage section 16 to store the visible light image 17a acquired from the visible-light camera 17 and the second infrared image 19a acquired from the infrared camera 19.

More specifically, in step S103, the user directs the center of the field-of-view FA of the image display apparatus 10 toward the internal central portion of the duct D7 of FIG. 7, changing from toward the wall W6 of FIG. 6. When the center of the field-of-view FA of the image display apparatus 10 is directed toward the internal central portion of the duct D7, the user stops movement of the image display apparatus 10 such that the center of the field-of-view FA of the image display apparatus 10 stay directed toward the internal central portion of the duct D7. When the movement of the image display apparatus 10 is stopped, the control section 11 causes the storage section 16 to store the visible light image 17a and the second infrared image 19b. The visible light image 17a and the second infrared image (second image) 19b stored in the storage section 16 are respectively a visible light image and an infrared image in each of which the reference position mark 72 is present at the internal central portion of the duct D7, as shown in FIG. 7.

Step S104: The second image processing section 11b of the control section 11 reads out the second infrared image 19b stored in the storage section 16, and acquires temperature information on each pixel included in the first infrared image 19b thus read out. The second image processing section 11b sets a reference temperature (second temperature), with use of the temperatures of pixels which are included in the second infrared image 19b and which correspond to the reference position mark 72 and its surrounding area. In a case where the temperatures of the pixels are different, the average of the temperatures of the pixels may be used as the reference temperature. In the screen example 70 of FIG. 7, the reference temperature is "35.0° C." as shown in the temperature display area 72a.

Step S105: The second image processing section 11b calculates an upper limit Tw+ and a lower limit Tw− of the temperature range using the following formulae:

$$Tw = k \times A \times (T2-T1)^B + C \quad (1)$$

$$Tw+ = T2 + D \times Tw \quad (2)$$

$$Tw- = T2 - (1-D) \times Tw \quad (3)$$

where: k is a scaling factor (third coefficient); A, B, C and D are predetermined coefficients; T1 is a surrounding environment temperature (first coefficient); and T2 is a reference temperature (second coefficient).

The formulae (1) to (3) are stored in the storage section 16 as the calculation formula data 16c. Further, the coefficients A, B and C are stored in the storage section 16 as the calculation formula data 16c.

In respective examples of FIGS. 6 and 7, the surrounding environment temperature T1 is "20.0° C.", and the reference temperature T2 is "35.0° C.". Further, for example, the coefficient A is set to "0.58", the coefficient B is set to "1.0", the coefficient C is set to "0", and the coefficient D is set to "0.25". The scaling factor k is set to "1". In this case, the upper limit Tw+ and the lower limit Tw− of the temperature range are calculated as below by substituting these values into the formulae (1) to (3).

$$Tw=1\times0.58\times(35.0-20.0)^{1.0}+0=8.7$$

$$Tw+=35.0+0.25\times8.7=37.2$$

$$Tw-=35.0-(1-0.25)\times8.7=28.5$$

As described above, the upper limit Tw+ of the temperature range is "37.2° C.", and the lower limit Tw− of the temperature range is "28.5° C.". As described above, the second image processing section 11b sets the upper limit Tw+ and the lower limit Tw− of the temperature range. Since the upper limit Tw+ and the lower limit Tw− of the temperature range are set by the second image processing section 11b, a user can save a trouble of setting the upper limit Tw+ and the lower limit Tw−.

The second image processing section 11b allocates hues to respective temperatures in the temperature range having the upper and lower limits set. The second image processing section 11b generates an image of the color bar 71a which reflects the hues allocated to the respective temperatures. The image of the color bar 71a is, for example, an image that changes in color in the order of "blue", "green", and "red" with increasing distance from the lower limit Tw− and with decreasing distance to the upper limit Tw+. The second image processing section 11b refers to the temperature range data 16b stored in the storage section 16 to decide which hue is to be allocated to each temperature. The hues allocated to the respective temperatures are stored as part of the temperature range data 16b in the storage section 16. The hues allocated to the respective temperatures can be rewritten by a user anytime.

Furthermore, as shown in FIG. 7, there is an upper limit display area 71c displayed near the top end of the color bar 71a and indicating "37.2° C." which is the upper limit Tw+. There is a lower limit display area 71d displayed near the bottom of the color bar 71a and indicating "28.5° C.". Further, there is a reference temperature marker 71b displayed on the color bar 71a and indicating a location corresponding to "35.0° C." that is the reference temperature T2.

The second image processing section 11b also sets the average temperature, the highest temperature and the lowest temperature in the screen example 70 of FIG. 7, on the basis of the temperature information on each pixel included in the second infrared image 19b. Each of the average temperature, the highest temperature and the lowest temperature thus set are displayed, in the temperature display area 710, as "Avg. 25.2° C." denoted by the reference sign 710a, "Max. 43.8° C." denoted by the reference sign 710b, and "Min. 9.3° C." denoted by the reference sign 710c.

Next, the following will describe the scaling factor adjusting bar 74a. Table 1 shows a relation of how the scaling factor k corresponds to each of integer values displayed in the scaling factor adjusting bar 74a.

TABLE 1

| Integer value | 1 | 2 | 3 | 4 | 5 | 5 | 7 | 8 | 9 |
|---|---|---|---|---|---|---|---|---|---|
| Scaling factor k | 1/5 | 1/4 | 1/3 | 1/2 | 1 | 2 | 3 | 4 | 5 |

As shown in Table 1, when the scaling factor k is "1/5", the integer value "1" is displayed at a position denoted by a reference sign 74b. The position denoted by the reference sign 74b is located in the vicinity of the center of the scaling factor adjusting bar 74a, as shown in FIG. 7. When the scaling factor k is "1", the integer value "5" is displayed at the position denoted by the reference sign 74b. In this way, the scaling factor k corresponds to the integer value displayed at the above position.

In the screen example 70 of FIG. 7, the integer value "5" corresponding to the scaling factor k is displayed at the position denoted by the reference sign 74b. Integer values of "4", "3", "2" and "1" in a descending order towards the left from the position where "5" is displayed correspond to respective positions of vertical lines 74c aligned at predetermined intervals with respect to the horizontal axis that corresponds to a longitudinal direction (direction of longer side) of the scaling factor adjusting bar 74a. The minimum value "1" corresponds to a leftmost end vertical line 74c of the scaling factor adjusting bar 74a. Integer values of "6", "7", "8" and "9" in an ascending order towards the right from the position where "5" is displayed correspond to respective positions of vertical lines 74c aligned at the predetermined intervals with respect to the horizontal axis of the scaling factor adjusting bar 74a. The maximum value "9" corresponds to a rightmost end vertical line 74c of the scaling factor adjusting bar 74a. A user can select the scaling factor k by performing a touch operation on the vertical lines 74c arranged on the scaling factor adjusting bar 74a. Alternatively, the user can select the scaling factor k by performing a touch operation on triangular marks 74d and 74e disposed at both end positions of the scaling factor adjusting bar 74a, respectively, so as to move a circle mark 74f leftward or rightward.

Note that as the scaling factor k increases, that is, as the integer value increases, the upper limit Tw+ of the temperature range increases and the lower limit Tw− of the temperature range decreases at the same time according to the formulae (1) to (3). That is, the width of the temperature range increases. In contrast, as the scaling factor k decreases, that is, as the integer value decreases, the upper limit Tw+ of the temperature range decreases and the lower limit Tw− of the temperature range increases at the same time according to the formulae (1) to (3). That is, the width of the temperature range decreases.

Note that respective display positions of the color bar 71a, the scaling factor adjusting bar 74a, and other components displayed on the screen example 70 shown in FIG. 7 are merely examples, and the display positions are not limited to those shown in FIG. 7.

The second image processing section 11b generates respective images that are used to display, on the screen 10a, the color bar 71a, the scaling factor adjusting bar 74a, and the other components displayed on the screen example 70.

Step S106: The second image processing section 11b reads out the second infrared image 19b stored in the storage section 16, and generates, from the second infrared image 19b thus read out, a thermal image in which temperature distribution of the duct D7 and its surrounding environment is shown by colors within the temperature range having the upper limit Tw+ and the lower limit Tw−set. More specifically, the second image processing section 11b refers to the temperature range data 16b stored in the storage section 16 to decide the color of each pixel of the second infrared image 19b on the basis of the temperature of that pixel. Then, the second image processing section 11b generates a thermal image in which each pixel is colored in accordance with the temperature.

Note that the second image processing section 11b may fix, in the thermal image, the "hue" for (i) a portion composed of a pixel(s) where a temperature higher than the upper limit Tw+ is obtained (upper-limit image) and (ii) a portion composed of a pixel(s) where a temperature lower than the lower limit Tw− is obtained (lower-limit image). In Embodiment 1, the "hue" is varied while the "saturation" and "lightness" are fixed. Since the "hue" is fixed for the upper and lower limit images, the "hue" can be changed only for the thermal image generated in the temperature range having the upper limit Tw+ and the lower limit Tw− set. Since the "hue" is fixed for a thermal image of temperatures higher than the upper limit of the temperature range or lower than the lower limit of the temperature range, a user can easily recognize only the "hue" in the temperature range of temperatures that the user desires to measure. Unlike the present embodiment, for example, in a case where the "hue" is fixed and the "saturation" and the "lightness" are changed, at least one of the "saturation" and the "lightness" may be fixed for the upper limit image and the lower limit image.

In the example of FIG. 7, a part of the surface of the duct D7, which part differs in temperature from its surrounding area due to the presence of a deposit X7, is colored differently from the surrounding area.

Step S107: The second image processing section 11b outputs, to the display processing section 11d, respective images that are used to display, on the screen 10a, the color bar 71a, the scaling factor adjusting bar 74a, and the other components displayed on the screen example 70. The second image processing section 11b outputs the thermal image to the display processing section 11d. The third image processing section 11c reads out the visible light image 17a stored in the storage section 16, and outputs, to the display processing section 11d, the visible light image 17a thus read out.

The display processing section 11d causes the screen 10a to display the images inputted from the second image processing section 11b and the third image processing section 11c such that the images from the second image processing section 11b are superimposed on the thermal image from the third image processing section 11c. In the screen example 70 of FIG. 7, the image of the duct D7 included in the visible light image and the image of the deposit X7 included in the thermal image are superimposed on top of each other. This allows the user to easily determine the position of the deposit X7.

Step S108: The control section 11 proceeds to step S109 if no user operation has been received via the touchscreen 15 (No in step S108).

On the other hand, if a user operation has been received via the touchscreen 15 (YES in step S108), the control section 11 carries out step S105 again.

More specifically, in step S108, the scaling factor k is selected by a touch operation on (i) the vertical lines 74c on the scaling factor adjusting bar 74a in FIG. 7 or (ii) the triangular marks 74d and 74e disposed at the both end positions of the scaling factor adjusting bar 74a in FIG. 7. The touchscreen 15 detects an integer value selected by a touch operation which is performed with user's finger or a stylus pen. In step S105, the second image processing section 11b calculates the upper limit Tw+ and the lower limit Tw− of the temperature range by substituting, into the formulae (1) to (3), the scaling factor k corresponding to the integer value detected by the touchscreen 15. Thereafter, the foregoing steps S105 to S108 are carried out.

A user can change the foregoing upper and lower limits by a simple action, that is, by only performing a touch operation on (i) the vertical lines 74c on the scaling factor adjusting bar 74a in FIG. 7 or (ii) the triangular marks 74d and 74e disposed at the both end positions of the scaling factor adjusting bar 74a in FIG. 7, while checking the thermal image displayed on the screen 10a. It is possible to provide a user-friendly method is provided by a configuration in which a thermal image is displayed with a temperature range having upper and lower limits freely set by the user.

A typical infrared camera automatically recognizes the highest and lowest temperatures in a captured image. The infrared camera allocates a hue to each temperature included in the temperature range defined by the recognized highest and lowest temperatures. For example, if there is an object that differs greatly in temperature from its surroundings in the captured image, the infrared camera automatically recognizes the temperature of the object as the lowest or highest temperature. Therefore, in an area that the user wants to examine, hue varies in large steps and therefore it is impossible to represent slight differences in temperature. Therefore, it is impossible for the user to recognize the slight differences in temperature.

With the image display apparatus 10, in this case, the user can change the foregoing upper and lower limits by a simple action so that the temperature of the object is out of the temperature range. With this, the user can cause a slight temperature difference, in the area that the user wants to examine, to be displayed in a thermal image with a temperature range having the changed upper and lower limits.

Step S109: The control section 11 terminates its operation if it is not necessary to reset the reference temperature (NO in step S109).

On the other hand, if the reference temperature needs to be reset (YES in step S109), the control section 11 carries out step S103 again.

More specifically, first a user changes the direction in which the center of the field-of-view of the image display apparatus 10 faces, from a first direction in which the center currently faces to a second direction which is different from the first direction and in which the center newly faces. Then, when the center of the field-of-view FA of the image display apparatus 10 is caused to face in the second direction, the user stops movement of the image display apparatus 10 so that the center of the field-of-view FA of the image display apparatus 10 stay facing in the second direction. When the movement of the image display apparatus 10 is stopped, the control section 11 determines that resetting the reference temperature is necessary. Then, the control section 11 causes the storage section 16 to store a visible light image 17a and a second infrared image 19b again. Thereafter, the foregoing steps S103 to S109 are carried out.

Alternatively, the control section 11 may cause the storage section 16 to store a visible light image 17a and a second infrared image 19b every time a predetermined time elapses, regardless of whether movement of the image display apparatus 10 is stopped. In this case, in step S109, the control section 11 determines that it is necessary to reset the reference temperature, if the predetermined time has elapsed after previous storage of the visible light image 17a and the second infrared image 19b in the storage section 16.

Variation 1 of Embodiment 1

Figure 8:
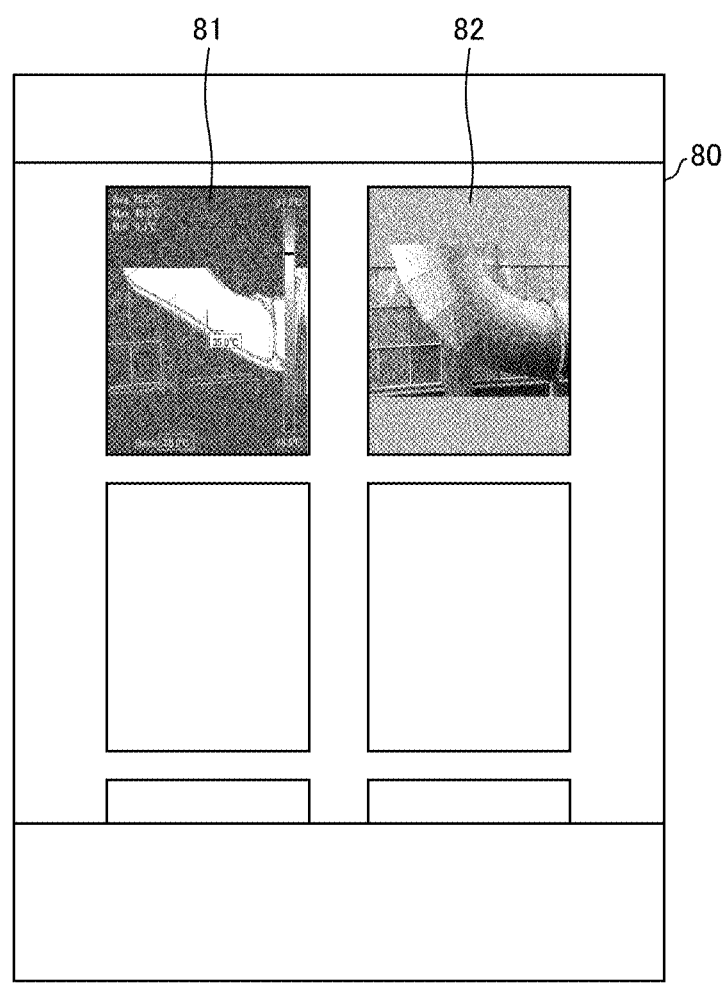
FIG. 8 illustrates an example of a screen in which a thermal image and a visible light image are displayed so as to be compared with each other.

FIG. 8 shows an example of the screen 10a in which a visible light image and a thermal image are displayed by the image display apparatus 10. As shown in FIG. 8, a screen example 80 (an example of the screen 10a) displays (i) an image 81 in which a visible light image and a thermal image are superimposed and displayed and (ii) an image 82 in which only the visible light image included in the image 81 is displayed, such that the image 81 and the image 82 are arranged to be adjacent to each other. The control section 11 generates an image of the screen example 80 and causes the screen 10a to display the image.

As shown in FIG. 8, the image display apparatus 10 displays the image 81 and the image 82 in contrast to each other. This allows the user to easily specify what portion of the image 82 displayed as the visible light image corresponds to a portion where a change in temperature distribution occurs. This allows the user to easily identify a portion where a deposit is present in the duct.

Variation 2 of Embodiment 1

Figure 9:
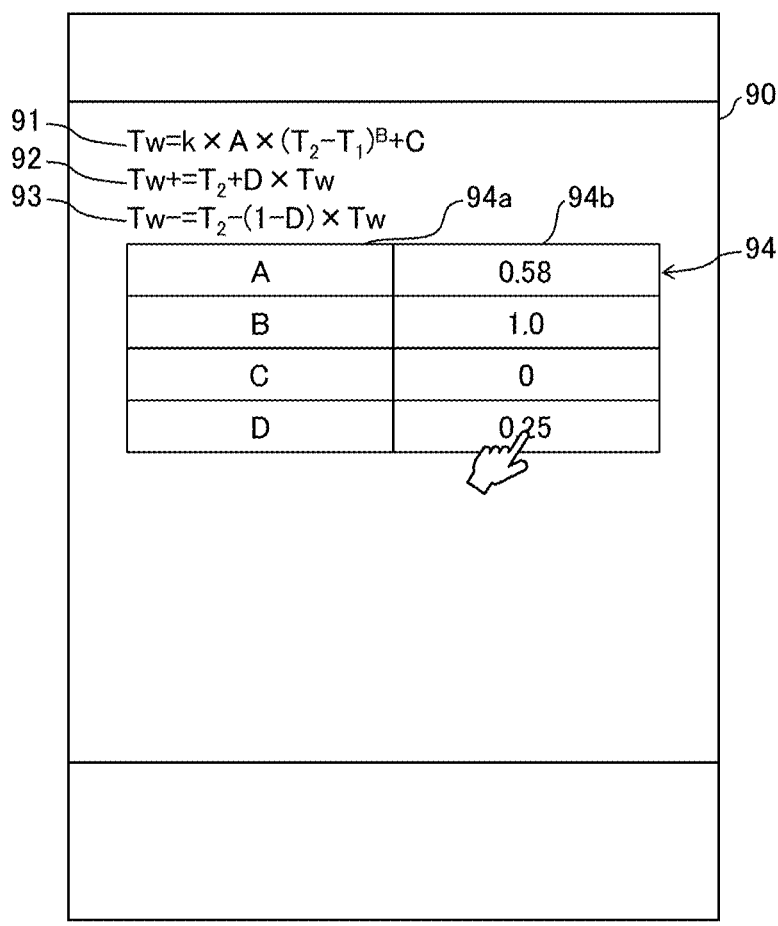
FIG. 9 illustrates an example of a setting screen for changing coefficients in calculation formulae.

FIG. 9 is a view showing an example of the screen 10a of the image display apparatus 10. As shown in FIG. 9, a screen example 90 (an example of the screen 10a) is a screen for allowing a user to change values of the coefficients A, B, C, and D which are included in the above formulae (1) to (3). The control section 11 generates an image of the screen example 90 and causes the screen 10a to display the image.

The example screen 90 displays a table 94 in which names of the coefficients A, B, C, and D are associated with current values of the coefficients A, B, C, and D, respectively. Specifically, the names of the coefficient A and the like are shown in a column denoted by a reference sign 94a. In a column denoted by a reference sign 94b, current values of the coefficient A and the like are shown. The screen example 90 also displays Formula (1) denoted by a reference sign 91, Formula (2) denoted by a reference sign 92, and Formula (3) denoted by a reference sign 93.

The user of the image display apparatus 10 can change respective values of the coefficients A, B, C, and D from those in the screen example 90. For example, the user can change the value of the coefficient A by performing a touch operation on an area where the current value "0.58" of the coefficient A is shown. Similarly, the respective values of the coefficients B, C, and D can also be changed by performing a touch operation on respective areas where the current values of the coefficients are shown.

FIG. 10 is a view showing an example of the screen 10a of the image display apparatus 10. As shown in FIG. 10, a screen example 100 (an example of the screen 10a) is a screen for allowing a user to change the value of the scaling factor k which is included in the above formula (1). The control section 11 generates an image of the screen example 100 and causes the screen 10a to display the image.

The screen example 100 shows a table 102 in which integer values to be displayed at the position denoted by the reference sign 74b in FIG. 7 are associated with values of the scaling factor k, respectively. Specifically, the integer values are shown in a column denoted by a reference sign 102a. The values of the scaling factor k are shown in a column denoted by a reference sign 102b. The screen example 100 also displays Formula (1) denoted by a reference sign 101.

The user of the image display apparatus 10 can change, to a desired value, the value of the scaling factor k associated with each of the integer values. For example, the user can change the value of the scaling factor k associated with the integer value "9" by performing a touch operation on an area showing the value "5" of the scaling factor k associated with the integer value "9". Similarly, it is possible to change the value associated with each of the integer values "1", "2", "3", "4", "5", "6", "7", and "8" by performing a touch operation on an area showing the value of the scaling factor k associated with each of the integer values.

As described above, the user can change the various coefficients A, B, C, and D and the scaling factor k corresponding to each of the integer values, so that it is possible to deal with various display aspects of the image display apparatus 10 in terms of temperature distribution.

Variation 3 of Embodiment 1

Figure 11:
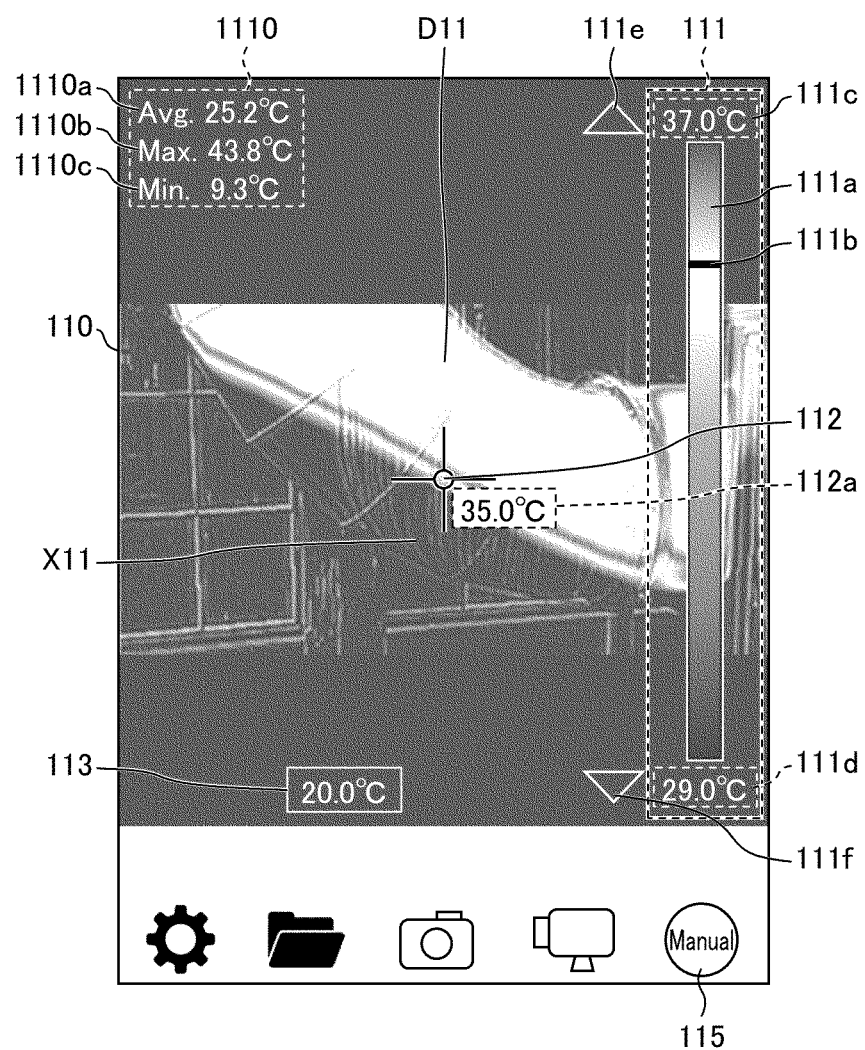
FIG. 11 illustrates an example of a setting screen for adjusting an upper limit and a lower limit of a temperature range in a manual mode.

FIG. 11 is a view showing an example of the screen 10a of the image display apparatus 10. As shown in FIG. 11, a screen example 111 (an example of the screen 10a) is a screen for setting the upper limit and the lower limit of the temperature range in a manual mode.

In Embodiment 1, after the surrounding environment temperature T1 and the reference temperature T2 are set, the upper limit Tw+ and the lower limit Tw− of the temperature range are calculated by the foregoing formulae (1) to (3).

In Variation 3 of Embodiment 1, as shown in FIG. 11, a user can change the upper limit Tw+ and the lower limit Tw− of the temperature range, by performing a touch operation on triangular marks 111e and 111f which are located in the vicinity of the upper limit display area 111c and a lower limit display area 111d of a color bar 111a, respectively.

The user can switch to the manual mode by performing a touch operation on an Auto/Manual switching button 115 at the lower right of the screen 111.

This allows the user to manually set the upper limit Tw+ and the lower limit Tw− of the temperature range. Therefore, it is possible to deal with a case where the user wants to slightly change the temperature range that is used for display of a thermal image.

Note that components except for the triangular marks 111e and 111f shown in FIG. 11 correspond to components shown in FIG. 7, respectively, and their descriptions are not repeated here. When any of the components of FIG. 11 is located at the same position as a component of FIG. 7 in the screen examples of FIG. 11 and FIG. 7, that component of FIG. 11 corresponds to the component of FIG. 7.

Variation 4 of Embodiment 1

As described above, the screen example 70 in FIG. 7 also displays, below the area 74, the mode change button 75, the moving image capture button 76, the screen shot button 77, the folder reference button 78, and the setting button 79, which prompt a user to make a touch operation.

The mode change button 75 is a button for switching a mode of the image display apparatus 10. The user can switch the mode of the image display apparatus 10 between an automatic mode and a manual mode by performing a touch operation on the mode change buttons 75. The automatic mode is a mode in which the operation of the image display apparatus 10 described in Embodiment 1 above is carried out. The manual mode is a mode in which the operation of image display apparatus 10 described in Variation 3 of Embodiment 1 is carried out.

The moving image capture button 76 is a button for capturing a moving image in a case where a subject is moving. The user, for example, performs a touch operation on the moving image capture button 76 in a case where the subject includes a moving structural object. This touch operation results in generation of a visible light image and a thermal image, which are moving images of the structural object, so that those moving images are displayed on the screen 10a. The moving images thus generated are stored in a predetermined storage device in the image display apparatus 10. For example, the moving images are stored in the storage section 16.

The screen shot button 77 is a button for making a screen shot of the screen 10a. For example, when a moving image is being displayed on the screen 10a as a result of a touch operation performed on the moving image capture button 76, a user performs a touch operation on the screen shot button 77 at a desired time. This touch operation results in generation of a still image. Note that the still image thus generated is stored in a predetermined storage device in the image display apparatus 10. For example, the moving image is stored in the storage section 16.

The folder reference button 78 is a button for making an access to a moving image which has been generated by a touch operation on the moving image capture button 76 and a still image which has been generated by a touch operation of the screen shot button 77. For example, the moving image and the still image are stored in a folder which is created in a predetermined storage device. The user can make an access to the folder, or display or delete the moving image and the still image in the folder, by performing a touch operation on the folder reference button 78.

The image display apparatus 10 is connected to a network via the communication section 21. The image display apparatus 10 can upload, via the network, the video image and the still image in the folder described above to a server(s) which is/are connected to the network. The server may download, via the network, the moving image and the still image which have been uploaded, onto another device which is connected to the network.

The setting button 79 is a button for causing the screen 10a to display each of the screen example 90 of FIG. 9 and the screen example 100 of FIG. 10 which are described above. A user can cause the screen 10a to display the screen example 90 of FIG. 9 or the screen example 100 of FIG. 10, by performing a touch operation on the setting button 79. Note that the user can cause the screen 10a to display a screen for changing various settings of the image display apparatus 10, by performing a touch operation on the setting button 79.

Embodiment 2

The following description will discuss another embodiment (Embodiment 2) of the present invention. For convenience of description, members having functions identical to those described in Embodiment 1 above are assigned identical reference signs, and their descriptions are not repeated here.

Figure 12:
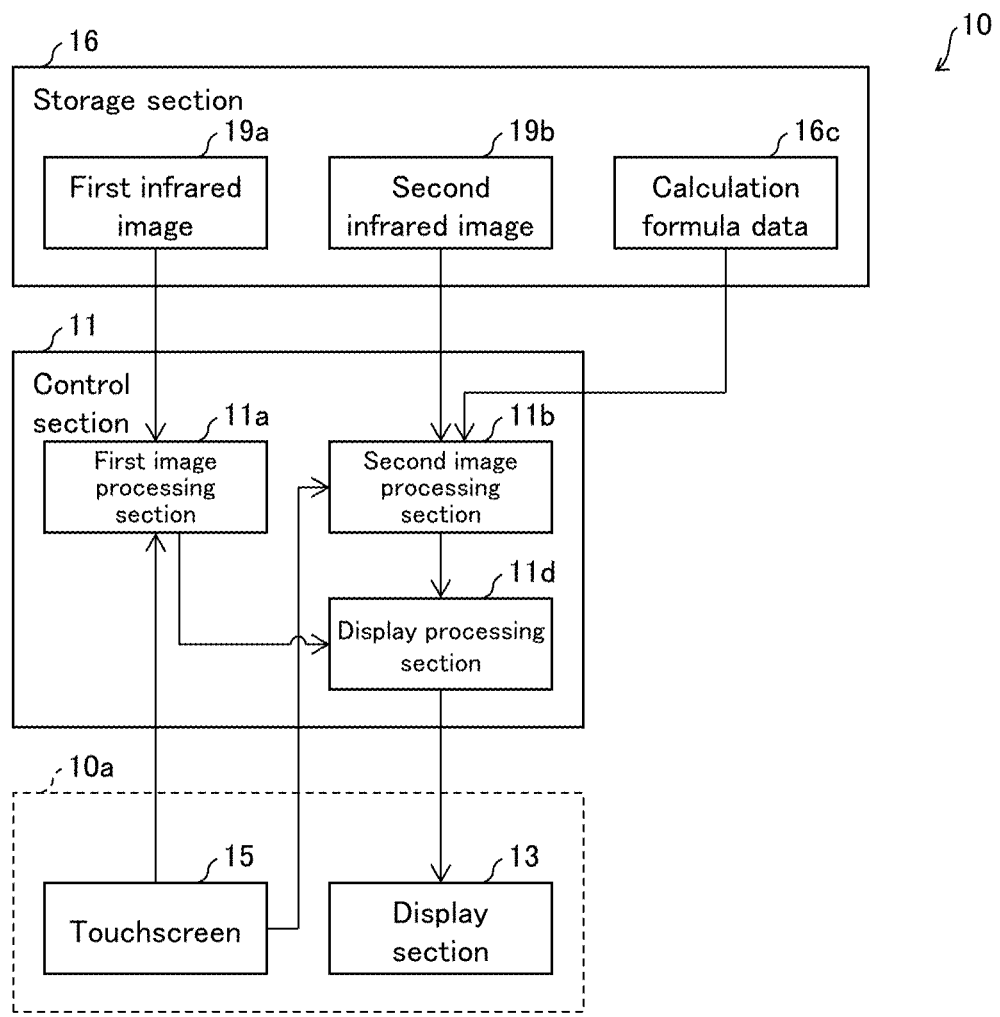
FIG. 12 illustrates a functional configuration of a control section included in an image display apparatus in accordance with Embodiment 2.

Embodiment 2 deals with a case where the visible-light camera 17 of Embodiment 1 is not present. FIG. 12 illustrates a functional configuration of a control section 11 included in an image display apparatus 10 in accordance with Embodiment 2. The control section 11 includes a first image processing section 11a, a second image processing section 11b, and a display processing section 11d. The processing sections 11a, 11b, and 11d included in the control section 11 are realized by the control section 11 executing an image display program 16a. The control section 11 of FIG. 12 is different from the control section 12 of FIG. 4 in that the third image processing section 11c is unnecessary in the control section 11.

The image display apparatus 10 has the function of causing the display section 13 to display a thermal image based on an infrared image captured by an infrared camera 19. This function of displaying an image is realized by the image display program 16a.

Figure 13:
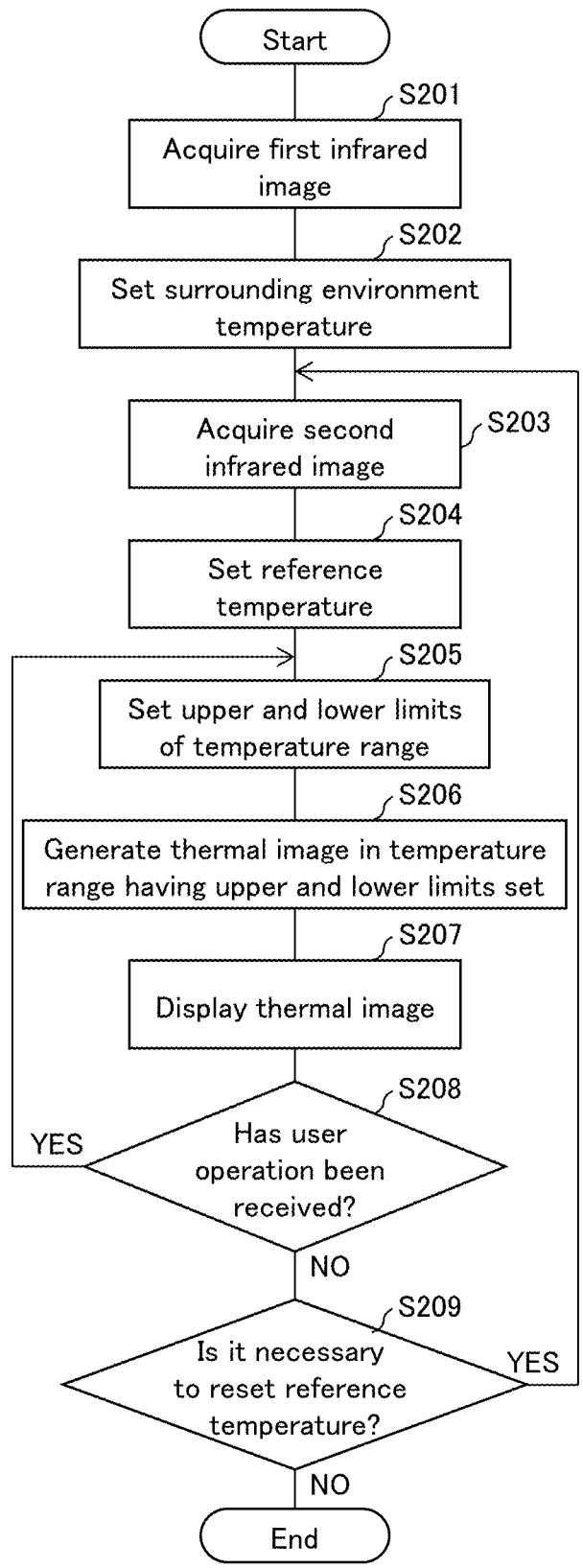
FIG. 13 is a flowchart illustrating operation of the image display apparatus in accordance with Embodiment 2.

FIG. 13 is a flowchart illustrating operation of the image display apparatus 10 in accordance with Embodiment 2. The flowchart of FIG. 13 illustrates a configuration in which the image display apparatus 10 does not use any visible light image 17a that is captured by the visible-light camera 17. Steps S201 to S209 of the flowchart of FIG. 13 correspond to steps S201 to S209 of the flowchart of FIG. 5, respectively. The flowchart of FIG. 13 is different from the flowchart of FIG. 5 only in that no visible light image captured by the visible-light camera 17 is used in the flowchart of FIG. 13. Therefore, each of the steps of the flowchart of FIG. 13 will not be described in detail.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 10 image display apparatus
10a screen
11 control section
13 display section

The invention claimed is:

1. An image display apparatus comprising:
a display section having a screen for displaying a thermal image in which a temperature distribution on a subject is represented by colors, the subject including a pipe for a fluid to flow and a surrounding environment of the pipe; and
a control section configured to control the display section, the control section being configured to,
set, as a first temperature, a temperature obtained from the thermal image at a first position in a first image corresponding to the surrounding environment in the thermal image, and set, as a second temperature, a temperature obtained from the thermal image at a second position in a second image corresponding to the pipe in the thermal image,
calculate an upper limit and a lower limit of a temperature range using calculation formulae which use the first temperature as a first variable, the second temperature as a second variable, and a first coefficient which takes one of a plurality of different predetermined numerical values as a third variable,
control the display section to display the thermal image such that the temperature distribution on the subject is represented by colors within the temperature range having the upper limit and the lower limit,
control the display section to display a first rectangular image such that the first rectangular image is superimposed on the thermal image, the first rectangular image being a user interface for changing the first coefficient in the calculation formulae, and the first rectangular image having a longer side in a direction in which the plurality of different predetermined numerical values are arranged in an ascending order or a descending order, wherein a first end of the longer side of the first rectangular image corresponds to a minimum value of the plurality of different predetermined numerical values, a second end of the longer side of the first rectangular image corresponds to a maximum value of the plurality of different predetermined numerical values, and the first rectangular image has positions corresponding to respective numerical values of the plurality of different predetermined numerical values excluding the minimum value and the maximum value, the positions being spaced apart from each other at predetermined intervals in the direction of the longer side.

2. The image display apparatus as set forth in claim 1, wherein the control section is configured to reset the second temperature when the image display apparatus moves.

3. The image display apparatus as set forth in claim 1, wherein the control section is configured to control the display section to display a second rectangular image when the upper limit and the lower limit are calculated, the second rectangular image representing the temperature range and being displayed such that the second rectangular image is superimposed on the thermal image, the second rectangular image has a longer side in an increasing or decreasing direction of temperature of the temperature range, and a first end of the longer side of the second rectangular image corresponds to the upper limit and a second end of the longer side of the second rectangular image corresponds to the lower limit.

4. The image display apparatus according to claim 1, wherein the control section is configured to control the display section to display the thermal image such that the temperature distribution on the subject is represented by variations in at least one of (i) hue, (ii) saturation, or (iii) lightness.

5. The image display apparatus according to claim 4, wherein the control section is configured to fix the at least one of (i) hue, (ii) saturation, or (iii) lightness for an upper limit image and a lower limit image in the thermal image when controlling the display section to display the thermal image, the upper limit image being an image having a temperature higher than the upper limit and the lower limit image being an image having a temperature lower than the lower limit.

6. The image display apparatus according to claim 1, wherein the display section is configured to display a visible light image of the subject, and the control section is configured to control the display section to display the visible light image such that the visible light image is superimposed on the thermal image.

7. The image display apparatus according to claim 1, wherein the image display apparatus is a terminal capable of being carried around by a user.

* * * * *